No. 847,224. PATENTED MAR. 12, 1907.
R. ATON.
VEHICLE BRACE.
APPLICATION FILED JAN. 20, 1906.
2 SHEETS—SHEET 1.
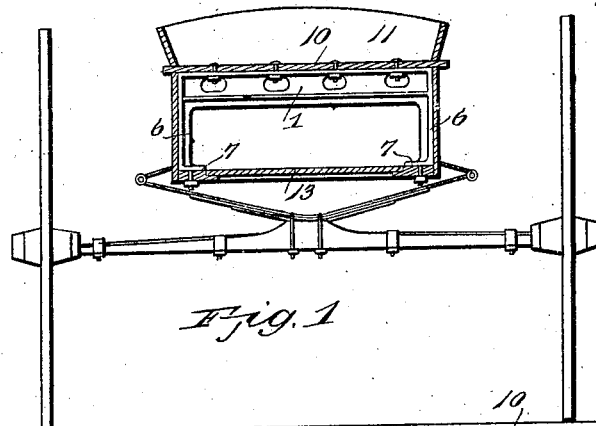
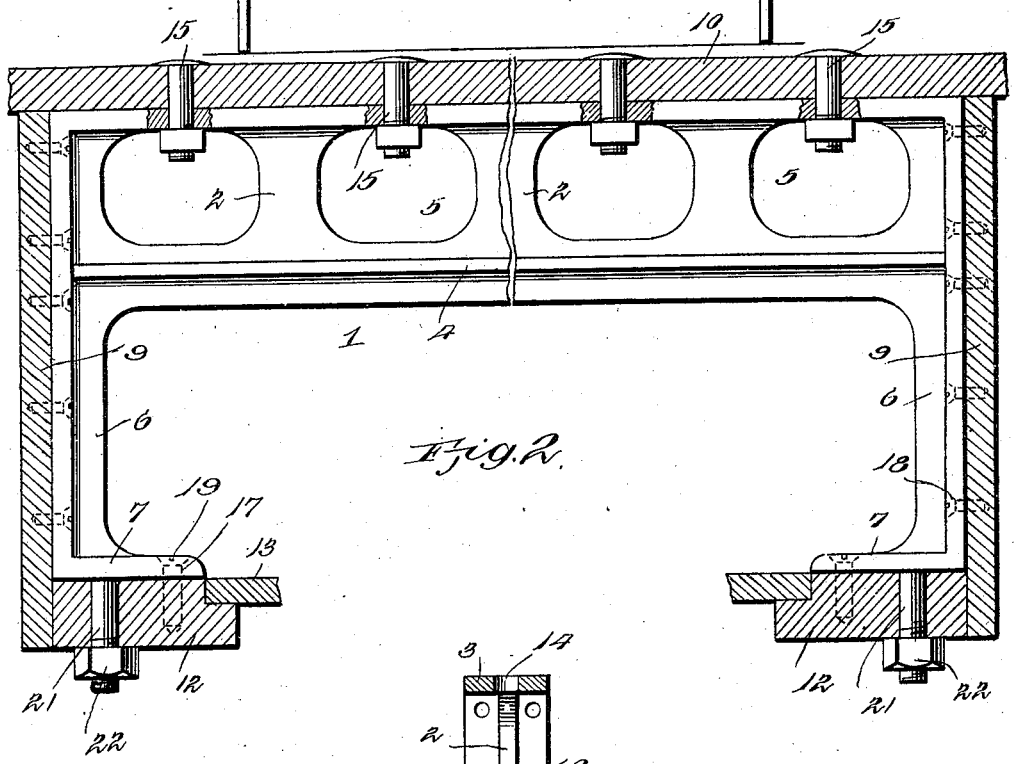
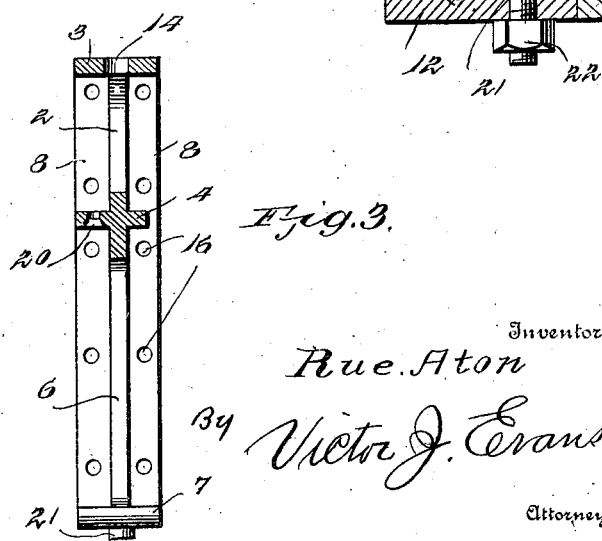
Witnesses
F. Hough
C. C. Hines.
Inventor
Rue Aton
By Victor J. Evans
Attorney
THE NORRIS PETERS CO., WASHINGTON, D. C.

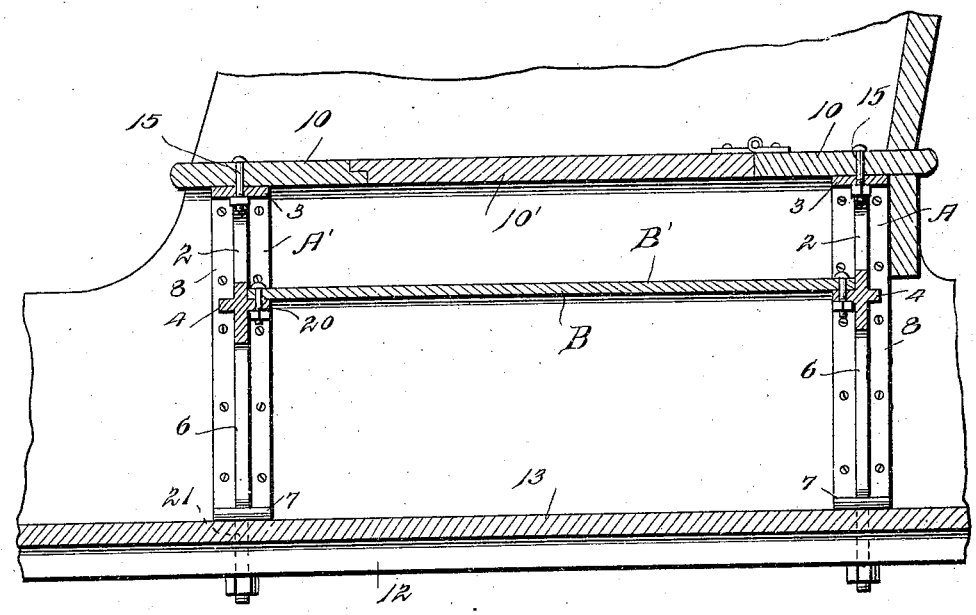

UNITED STATES PATENT OFFICE.

RUE ATON, OF INDEPENDENCE, KANSAS.

VEHICLE-BRACE.

No. 847,224.     Specification of Letters Patent.     Patented March 12, 1907.

Application filed January 20, 1906. Serial No. 297,044.

*To all whom it may concern:*

Be it known that I, RUE ATON, a citizen of the United States of America, residing at Independence, in the county of Montgomery and State of Kansas, have invented new and useful Improvements in Vehicle-Braces, of which the following is a specification.

This invention relates to combined body and seat braces for vehicles, the object of the invention being to provide a simple, staunch, and inexpensive construction of bracing-iron for staying the sides of a vehicle-body and preventing spreading thereof and also for supporting the vehicle-seat, the construction also being such as to obviate the necessity of boring perforations through the sides of the body for the passage of fastenings at the points where they are secured to the side posts.
Another object of the invention is to provide a construction and arrangement of braces whereby the seat will be firmly tied to the vehicle-body and a receptacle formed which may be utilized as a box or chamber in which curtains, cushions, and robes may be stored, and, further, to provide a brace which is readily applicable to vehicles in use.

In the accompanying drawings, Figure 1 is a cross-section through a vehicle body and seat, showing one of the braces applied thereto. Fig. 2 is a similar view, on an enlarged scale. Fig. 3 is a cross-section through the brace. Fig. 4 is a vertical front to rear section through the seat and braces.
Referring now more particularly to the drawings, the numeral 1 designates my improved combined brace and angle-iron, which comprises in its construction a body-plate 2 of proper length to extend between the sides of the vehicle box or body. The plate 1 is vertically disposed and is provided at top and bottom with horizontal flanges 3 and 4 to stiffen and strengthen it, the upper flanges 3 being arranged to form a seat-plate to bear against and support the bottom of the vehicle-seat. Said body-plate 1 is formed at intervals with openings 5 to reduce weight and cheapen the cost of construction.
At its ends the body-plate is formed with downwardly-extending legs, posts, or standards 6, terminating at their lower ends in inwardly-projecting horizontal foot-pieces 7, and at both sides of the body and the standard, depending therefrom, are formed flanges 8.

It will be observed that the body-plate 2, with its flanges 3 and 4, forms a horizontal cross-bar extending transversely of the body of the vehicle and provided with vertical depending legs 6.

In the drawings I have shown one of the braces arranged to form a combined angle and seat brace, and it will be observed that the plate 1 extends across the body, with its end portions and standards bearing against the side walls 9 of the body, the flanges 3 bearing against the under side of the bottom 10 of the seat 11 and the foot-pieces 7 resting upon the sills 12, to which the bottom boards 13 of the vehicle-body are secured.

In order to secure the brace in position and tie the parts together, the seat-flange 3 is formed at intervals with openings 14 for the passage of bolts 15 or stub-screws, which fasten the seat-bottom board 10 thereto, while the side flanges 8 and foot pieces 7 are respectively provided with openings 16 and 17 for the passage of screws 18 and 19 to secure the same to the side walls 9 and sills 12. The ends of the brace and the standards take the place of the usual side posts at the point of the body where the seat is placed and securely tie the seat-bottom and sides of the vehicle-body together and to the sill, thus firmly fastening the seat in place and holding the sides from spreading under the strains which fall thereon.

It will be observed that the screws 18 project into the sides 9 from the interior of the body and do not extend entirely through the sides, thus obviating the objectionable practice of fastening the sides to braces or cornerposts by boring openings completely through the sides and inserting screws therethrough from the outside, a mode of connecting the parts which not only weakens the sides of the body, but necessitates the use of putty to close the outer ends of the openings and a liberal number of coats of paint to conceal the unsightly portions thus formed, but does not prohibit the use of a stub-screw or bolt from outside, if preferred.

In practice two braces constructed in the manner described are employed and spaced a distance apart equivalent to the width or distance between the front and rear edges of the seat-bottom board 10, one to support the front and the other the rear edge of said board and brace the sides. A board B is also extended between the bottom flanges 4 of the two braces and secured thereto by fastening bolts or screws through openings 20 in said flanges, so as to provide a chamber or compartment B' below the seat, the bottom of which is formed by the applied board to hold curtains, seat-cushions, robes, and other articles. It will be understood that access to this chamber or box will be afforded by providing the seat-bottom 10 with a hinged portion forming a door 10' to admit access to and close the chamber. If desired, a brace of the character described may be employed at the rear end of the body to unite the parts thereof at that point, and in practice the braces will be made of different sizes to suit the widths and heights of different vehicle-bodies.

If desired, each foot-piece 7 may be further united to the underlying sill by a bolt 21 and nut 22 applied thereto.

Having thus described the invention, what is claimed as new is—

1. A brace for vehicles comprising an upper horizontal member adapted to extend across the vehicle-body, said member comprising a vertical plate having horizontal top and bottom flanges, and depending legs formed with lateral flanges and inwardly-extending foot-pieces, the upper flange of the body portion and laterally-extending flanges of the legs being provided with openings for the passage of fastenings, whereby said plate and legs are adapted to be secured to the seat-bottom and sides of the vehicle-body, and bolts for connecting the foot-pieces to the sills of the vehicle-body.

2. A brace for vehicles comprising a vertically-disposed body-plate having horizontal top and bottom flanges, and depending legs formed with lateral flanges and inwardly-extending foot-pieces, the upper flange of the body portion and laterally-extending flanges of the legs and foot-pieces being provided with openings for the passage of fastenings.

In testimony whereof I affix my signature in presence of two witnesses.

RUE ATON.

Witnesses:
 JOHN CAFFEY,
 J. W. BOWERS.